United States Patent

Lardy et al.

[11] Patent Number: 5,609,544
[45] Date of Patent: Mar. 11, 1997

[54] CONTROL DEVICE AND CONTROL PROCESS FOR AN INFINITELY VARIABLE TRANSMISSION

[75] Inventors: Patrick Lardy, Weil der Stadt; Joseph Petersmann, Wimsheim, both of Germany

[73] Assignee: Dr. Ing. h.c.F. Porsche AG, Germany

[21] Appl. No.: 558,288

[22] Filed: Nov. 13, 1995

[30] Foreign Application Priority Data

Nov. 24, 1994 [DE] Germany .......... 44 41 878.7

[51] Int. Cl.$^6$ ............ F16H 59/06; F16H 59/36; B60K 41/16
[52] U.S. Cl. .......................... 477/46
[58] Field of Search .................. 477/46, 48

[56] References Cited

U.S. PATENT DOCUMENTS 4,867,732 9/1989 Soga et al. .............. 477/46

5,514,046 5/1996 Petersmann et al. .......... 477/46

FOREIGN PATENT DOCUMENTS 4120540 11/1992 Germany .
4239133 12/1993 Germany .

*Primary Examiner*—Dirk Wright
*Attorney, Agent, or Firm*—Evenson, McKeown, Edwards & Lenahan P.L.L.C.

[57] ABSTRACT

A CVT is operated in both a continuously-variable mode and in a simulated stepped-ratio mode. In the stepped ratio mode, the highest preset transmission ratio (e.g., "first gear"), is variable and responsive to vehicle driving conditions. A control senses a low vehicle speed operating condition and adapts the highest ratio to reduce the step up to the next preset ratio. The control also senses a vehicle start condition and adapts the highest ratio to the current engine torque to improve drivability.

20 Claims, 6 Drawing Sheets

CONTROL DEVICE AND CONTROL PROCESS FOR AN INFINITELY VARIABLE TRANSMISSION

BACKGROUND AND SUMMARY OF THE INVENTION

This invention relates to a process and apparatus for controlling an infinitely variable transmission in a manner that simulates a stepped transmission.

In known stepped transmissions, the transmission ratio jumps must be determined within the framework of the transmission layout, and can be optimal only for one driving situation. The transmission layout is therefore based on an average driving situation. A transmission layout obtained in this manner cannot be optimal in deviating driving situations, for example, during uphill or downhill driving, driving with a load or driving in traffic jams. Thus, the layout of the first gear is usually selected such that a loaded vehicle can also still start on steep slopes. However, in traffic jams or during stop-and-go traffic, this leads to frequent shifting operations because the layout of the first gear is too short for this situation and the driving engine rapidly reaches its rotational speed limit.

German Patent Document DE-A1 41 20 540 discloses an infinitely variable transmissions which simulates a stepped transmission in that transmission ratios are fixedly defined. Furthermore, German Patent Document DE-A1 42 39 133 discloses an arrangement which simulates an automatic multi-step transmission by means of an infinitely variable transmission while also defining fixed transmission ratios. The above-mentioned problems also occur here.

It is an object of the present invention to provide an improved transmission control of the generic type described above, which adapts the starting gear or the starting transmission ratio to a "low speed" driving situation.

This object is achieved by the control method and apparatus according to the invention, which includes a device for recognizing driving situations in which the transmission ratio jump to the next selected gear will be too large, as well as a device for adapting the presently selected preset transmission ratio in a manner which reduces such jump. That is, the recognition function activates the adapting function as soon as conditions exist which indicate a state of "low speed driving". The adapting device then reduces the transmission ratio from the current (highest) preset transmission ratio (that is, the "lowest gear"), starting at a predetermined engine speed at which the driving engine has built up a sufficient drive torque. (As noted hereinafter, the "transmission ratio" connotes a ratio of engine speed or transmission input speed divided by transmission output speed. Accordingly, a reduction of the transmission ratio changes the transmission ratio in the direction of what is conventionally referred to as the next higher "gear".)

This arrangement substantially improves the drivability of the highest preset transmission ratio (that is, the transmission ratio that corresponds to a "first gear") and, at the same time, reduces the shifting frequency, because the highest preset transmission ratio can be utilized over a larger speed range. Since the invention can be used in manually as well as automatically shifted transmissions, in the recognized driving situations the transmission ratio is adapted to the existing operating conditions of the vehicle without any loss of the typical characteristics of a stepped transmission.

In one embodiment of the invention, low speed driving is recognized when both the position and the adjusting speed of a power control element (for example, of an accelerator pedal or of a throttle valve) remain below preset limits. Alternatively, it is determined for this purpose whether the driving speed as well as the adjusting speed of the power control element remain below preset limit values.

In a further embodiment of the invention, the adapting function is triggered in response to the detection of a "starting operation", that is, for example, when the conditions indicated above are met immediately after the recognition of a vehicle stop (driving speed=0). By this type of recognition of low speed driving, a multitude of driving situations are recognized which have in common that driving occurs in a lower speed range for an extended period of time. This applies, for example, to both stop-and-go traffic and to door-to-door delivery traffic.

For adaptation of the highest preset transmission ratio (the lowest "gear"), in another embodiment of the invention, the transmission ratio is selected so that the rotational input speed of the transmission (or the rotational speed of the driving engine) remains constant. This adjustment of the transmission ratio is implemented as soon as the rotational input speed of the transmission reaches a minimum value, which is selected as a function of the throttle valve position, in order to thus adjust a rotational input speed level which corresponds to the throttle valve position, and therefore also an engine power level. Adjustment of the transmission ratio will end when the transmission ratio has reached a preset lower limit value, as described hereinafter.

In an alternative embodiment, the transmission ratio is adapted according to a preset function, depending on the rotational input speed of the transmission or on the driving speed of the vehicle. In this case also, the adjustment is started as soon as the rotational input speed reaches a preset value. This value of the rotational input speed need not be fixed, but can be adapted to the operating conditions. The adjustment is again terminated when a limit value for the transmission ratio is reached. Advantageously, the function for adjusting the transmission ratio is selected such that a limit value for the rotational input speed is reached at the same time when the limit value for the transmission ratio is reached. The limit value for the rotational input speed is advantageously selected slightly below the rotational input speed at which a transmission ratio change is automatically triggered, so that the end of the transmission ratio adjustment does not coincide with the change of the transmission ratio.

The lower limit value at which adjustment of the transmission ratio ends is advantageously selected so that a set proportion of the transmission ratio jump from the presently selected preset transmission ratio to the next lower preset transmission ratio is maintained between the adjusted transmission ratio to the next lower preset transmission ratio. In this manner, it is ensured that, upon change to the next lower preset transmission ratio, another transmission ratio jump takes place and thus the character of a stepped transmission is maintained.

The invention may be implemented in the form of a program, using a microprocessor-operated programmable control device. Of course, it is also possible to implement the invention by means of known discrete circuits elements, such as differential amplifiers. Thus, the invention relates to an operating range which can be implemented in the form of a control device as well as of a control process, and the illustrated effects and advantages apply equally to the construction of the control device as well as the implementation of the control process.

The above-described effects and advantages relate to a manually shifted as well as to an automatically shifted simulation of a stepped transmission by means of an infinitely variable transmission.

Other objects, advantages and novel features of the present invention will become apparent from the following detailed description of the invention when considered in conjunction with the accompanying drawings.

DETAILED DESCRIPTION OF THE DRAWINGS

Figure 1:
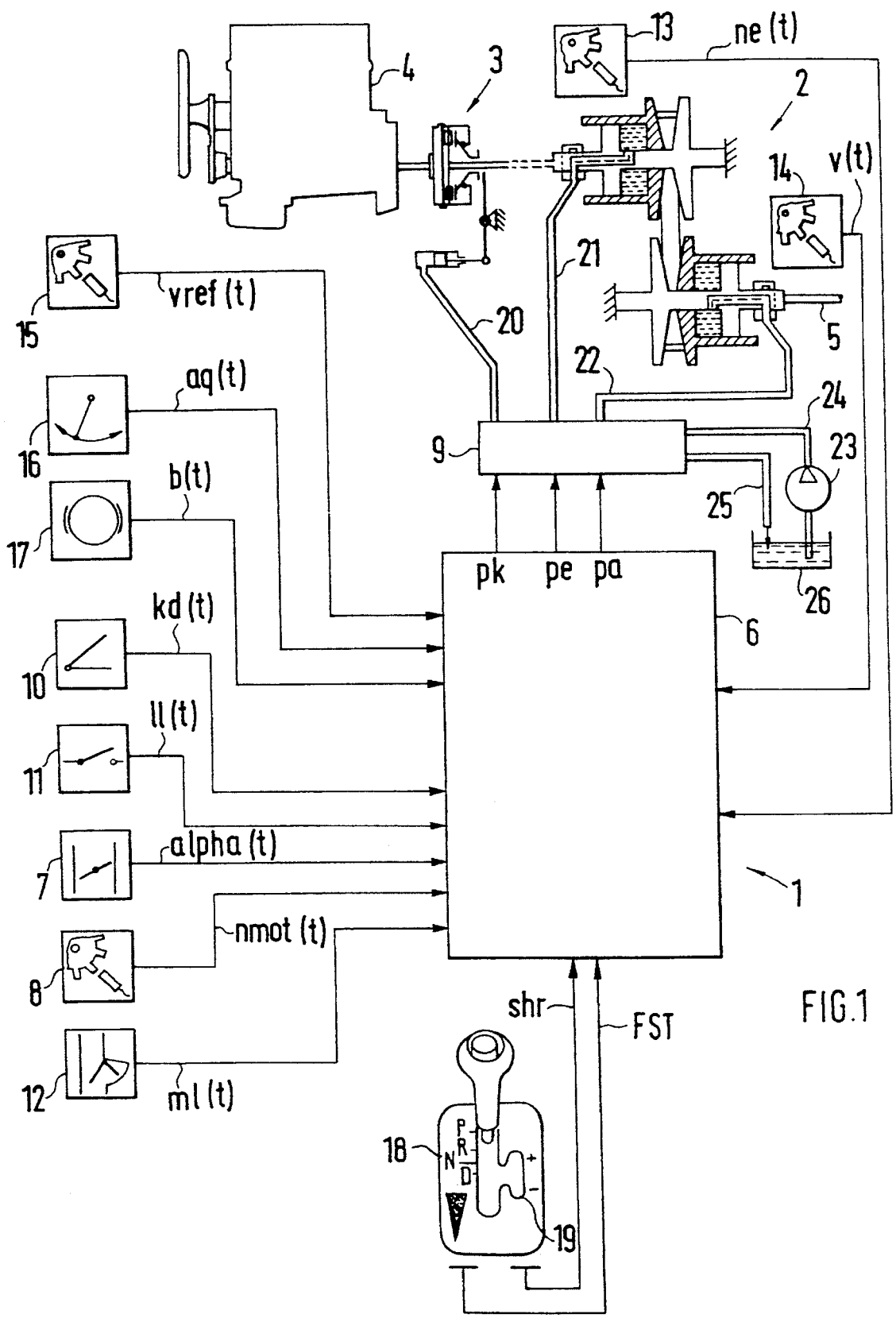
FIG. 1 is an overview of an infinitely variable transmission with a control system according to the invention.

FIG. 1 is an overview of an electrohydraulically operated infinitely variable transmission 2 with a control system 1 based, for example, on a wind-around transmission. The infinitely variable transmission 2 is driven by an internal-combustion engine 4 by way of a controllable starting clutch 3. An output shaft 5 of the infinitely variable transmission 2 is connected with a drive wheel of a motor vehicle (not shown). Variables or functions which change with the time t are illustrated in the following as functions f(t) of time t (for example, alpha(t) in FIG. 1).

A control unit 6 controls a hydraulic valve block 9 as a function of at least the throttle valve position alpha(t) of a throttle valve angle generator 7 and a rotational engine speed nmot(t) of a rotational engine speed generator 8 of the internal-combustion engine 4. To control the infinitely variable transmission 2 and the starting clutch 3, the control unit 6 receives, as additional input variables, a kick-down signal kd(t) of a kick-down switch 10, an idling signal 11(t) of and idling switch 11, an air quantity or air mass ml(t) of an air quantity or air mass generator 12 of the internal-combustion engine 4, as well as a transmission rotational input speed ne(t) of a transmission rotational input speed generator 13 and a driving speed v(t) of a driving speed generator 14. The transmission rotational input speed ne(t), when the starting clutch is closed, corresponds to the rotational engine speed nmot(t) and may then be used in its place. In addition, the control unit 6 detects and processes a speed vref(t) of a reference speed generator 15 on a nonpowered vehicle axle, a lateral acceleration aq(t) of a lateral acceleration generator 16 and a brake signal b(t) of a brake signal generator 17.

Finally, the control can normally be influenced by the vehicle driver by way of a selecting device 18 for preselecting the driving positions P (parking position), R (reverse gear position), N (idling gear position) and D (automatic adjusting of the transmission ratio of the infinitely variable transmission). In addition, an adjusting range of the selecting device 18 is provided for directly defining the transmission ratio.

The selecting device 18 can be moved from driving position D into a second shifting channel 19 in which, from a central inoperative position it operates as a rocker switch by which the vehicle driver can influence the transmission ratio in the sense of an upshifting or downshifting. The selecting device 18 emits a driving position signal FST and a shifting requirement signal shr for an upshifting or a downshifting.

Here and in the following, the term "upshifting" or "reducing the transmission ratio" indicates a transmission ratio change which, for a given rotational input speed increases the rotational output speed of the transmission, corresponding to an upshifting in the case of a stepped transmission. Inversely, the terms "downshifting" and "increasing the transmission ratio" indicate a transmission ratio change in the sense of a reduction of the rotational output speed of the transmission while the rotational input speed remains the same, corresponding to a downshifting in the case of a stepped transmission.

As a function of the mentioned variables, the control unit 6 controls the hydraulic pressure in the starting clutch 3 in a conventional manner by way of a signal output pk and the hydraulic valve block 9 as well as an actual transmission ratio ue between the transmission rotational input speed ne(t) and the transmission rotational output speed (driving speed) v(t) by way of signal outputs pe and pa and the hydraulic valve block 9. For this purpose, the hydraulic valve block 9 connects corresponding control lines 20, 21 and 22 of the starting clutch 3 and of the infinitely variable transmission 2 with a pressure line 24 connected to a pump 23 or with a return flow line 25 to a storage tank 26 for the hydraulic fluid.

Figure 2:
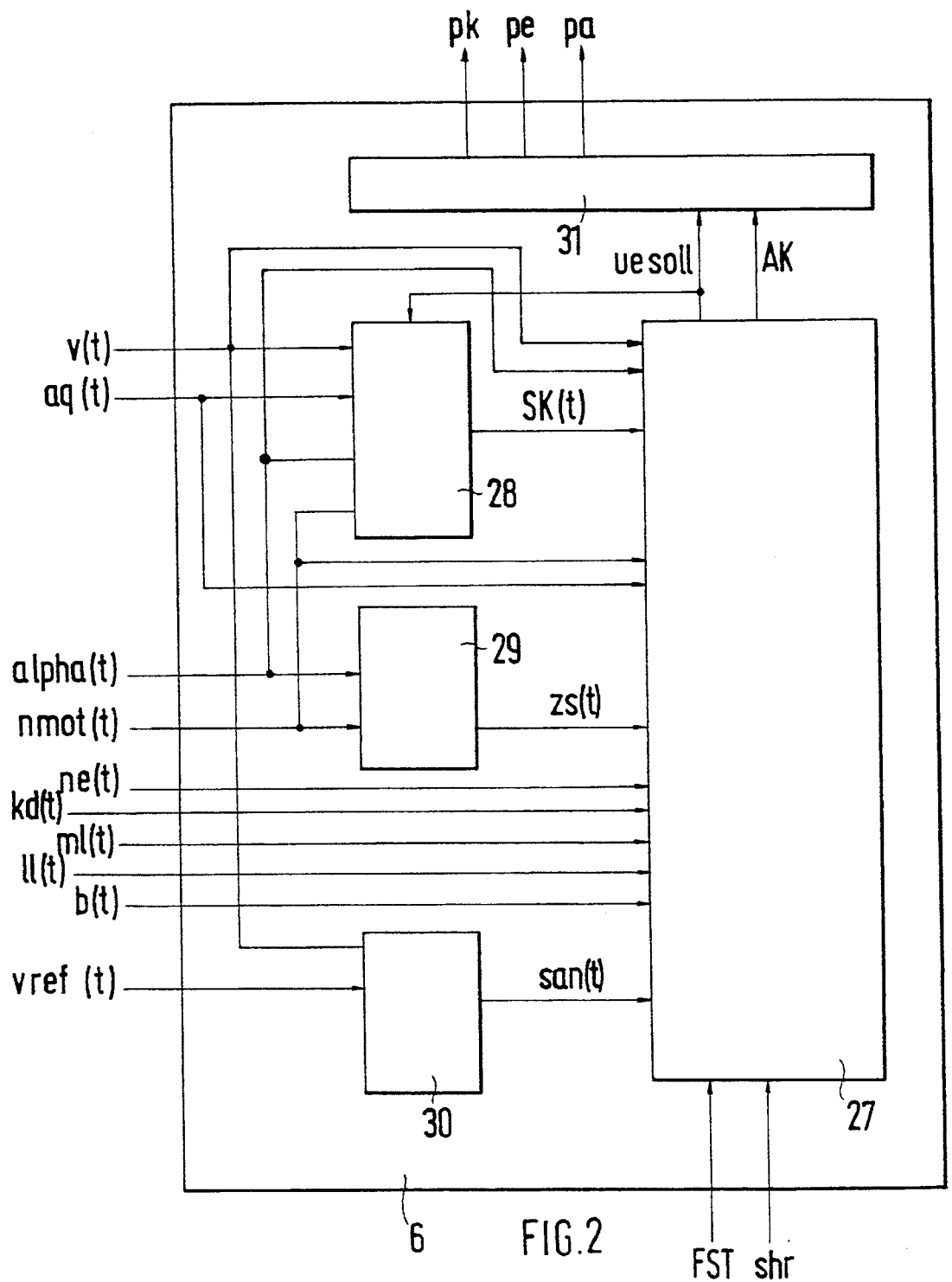
FIG. 2 is a schematic block diagram of a transmission ratio control according to the invention.

As illustrated in FIG. 2, the control unit 6 comprises a transmission ratio control unit 27 which is connected with a driving activity determining function 28, a drive/coasting determining function 29, a wheel slip determining function 30 and an adjusting function 31.

The driving activity determining function 28 determines a driving activity variable SK(t) which evaluates the driver's driving style or his traffic-situation-dependent action with respect to the control of the motor vehicle in a known manner, and preferably according to a process described in German Patent Document DE-A1 39 22 051.

Depending on the throttle valve position alpha(t) and the rotational engine speed nmot(t), the drive/coasting determining function 29 emits a signal indicative of drive or coasting operation of the vehicle zs(t), and the wheel slip determining function 30 determines a wheel slip san(t), representing the slip of the driven wheels, from the difference of the driving speed v(t) and the speed vref(t).

From these variables, as well as the driving position signal FST, the shifting requirement signal shr, the throttle valve position alpha (t), the kick-down signal kd(t), the idling signal 11(t), the air mass ml(t), the transmission rotational input speed ne(t), the driving speed v(t), the lateral acceleration aq(t), the braking signal b(t) and the transmission rotational output speed ne(t), the transmission ratio control system 27 determines a desired transmission ratio $ue_{des}$ as well as a driving clutch open/shut signal AK which are transmitted to the adjusting function 31.

By means of the signal outputs pe and pa, the adjusting function 31 controls adjustment of the actual transmission ratio ue of the transmission 2, with the desired transmission ratio $ue_{des}$ being adjusted with the shortest possible time delay, but without any noticeable overshooting. Furthermore, the starting clutch is controlled according to the starting clutch open/shut signal AK by the adjusting function 31 by way of the signal output pk.

Figure 3:
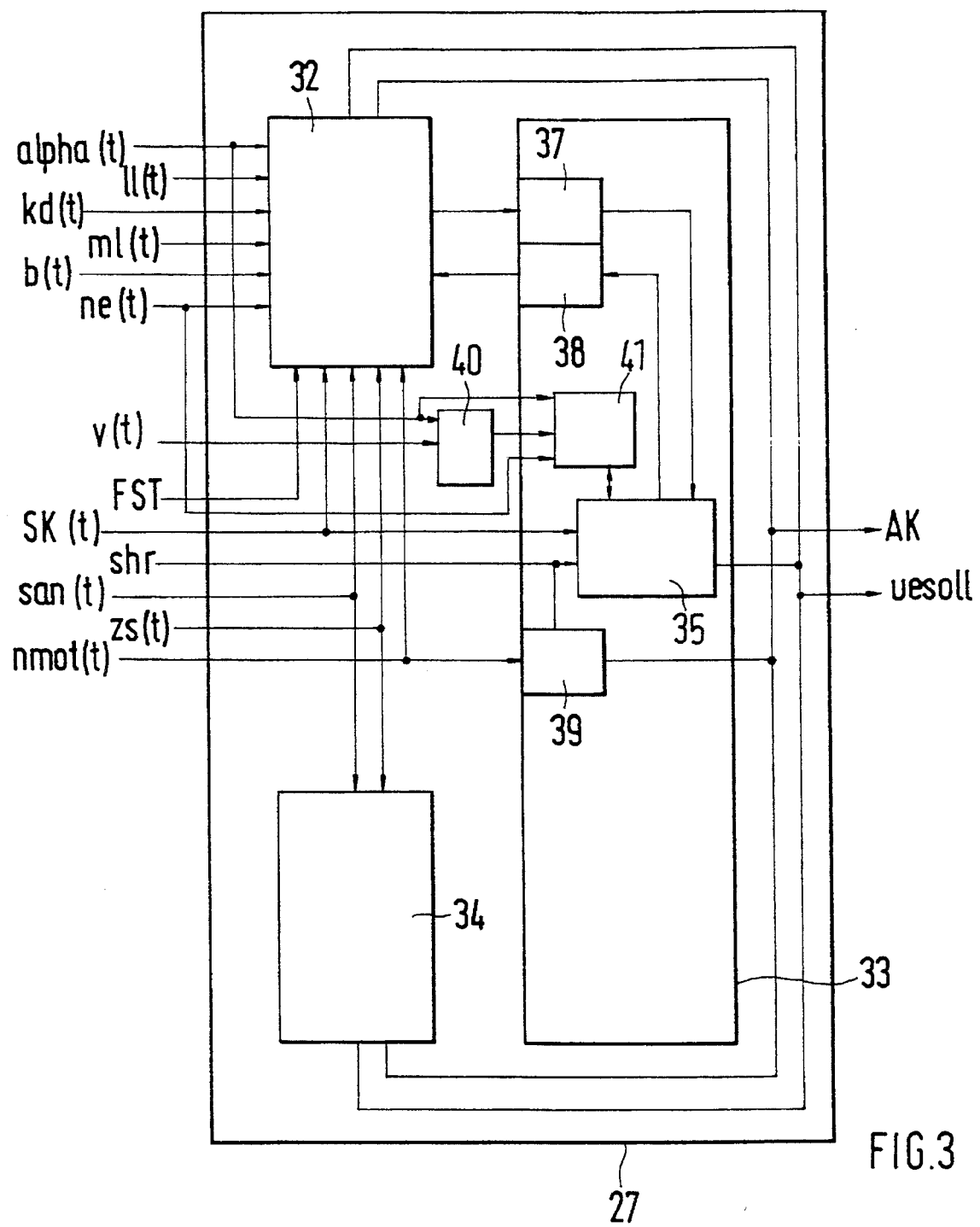
FIG. 3 is a block diagram which illustrates functions contained in the transmission ratio control.

FIG. 3 is a block diagram of the functions contained in the transmission ratio control unit 27. For the first method of operation, in which the transmission ratio is selected automatically, an automatic function 32 is provided with the input variables drive/coasting zs(t), wheel slip san(t), driving position signal FST, driving activity SK(t), throttle valve position alpha(t), rotational engine speed nmot (t), idling signal 11 (t), kickdown signal kd(t), air mass signal ml(t), braking signal b(t) and transmission rotational input speed ne(t). For the second method of operation, which is influenced by the driver, there is a manual function or mode 33 which uses the input variables shifting requirement signal shr, driving activity SK(t) and rotational engine speed nmot(t). Furthermore, the transmission ratio control system 27 also comprises a driving safety function 34 with the input variables drive/coasting zs(t) and wheel slip san(t). The above-mentioned functions each generate the output signals desired transmission ratio $ue_{des}$ and driving clutch open/shut signal AK.

Within the manual function 33, a basic function 35 determines an intermediate signal of a desired transmission ratio $ue_{des\_z}$ from the driving activity SK(t) and the shifting requirement signal shr. A first transition function 37 and a second transition function 38 (described hereinafter) are linked to the basic function 35, the two transition functions each being connected with the automatic function or mode 32. In parallel to the basic function 35, a safety function 39 is acted upon by the rotational engine speed nmot(t) and emits the shifting requirement signal shr as well as the driving clutch open/shut signal AK.

The basic function 35 contains a table (not shown) in which preset desired transmission ratios $ue_{des\_i}$ are stored. Since each of these preset desired transmission ratios $ue_{des\_i}$ corresponds to a gear of a simulated stepped transmission, as many preset desired transmission ratios $ue_{des\_i}$ are provided as there are gears of a stepped transmission that is simulated. The preset desired transmission ratios $ue_{des\_i}$ may therefore also be called gears.

In the illustrated example, a 5-gear stepped transmission is simulated so that, for forward driving, the preset desired transmission ratios $ue_{des\_1}$, $ue_{des\_2}$, $ue_{des\_3}$, $ue_{des\_4}$ and $ue_{des\_5}$ are stored in the table. The designation $ue_{des\_i}$ of the preset desired transmission ratios accords with the $ue_{des}$ pattern, in which i indicates the corresponding gear of the stepped transmission. $ue_{des\_3}$ therefore indicates the preset desired transmission ratio which corresponds to the 3rd gear of the stepped transmission. (As noted previously, while the gears become "higher" from $ue_{des\_1}$ to $ue_{des\_5}$, the value of the preset desired transmission ratio is reduced in this direction: the preset desired transmission ratio is the highest at $ue_{des\_1}$ and the lowest at $ue_{des\_5}$.)

Finally, an adapting function 41 for the desired transmission ratio $ue_{des}$ is provided which, for low speed driving situations recognized by a recognition function 40, changes the presently selected, preset desired transmission ratio $ue_{des\_i}$ (that is, selected from the preset desired transmission ratios $ue_{des\_i}$ stored in the basic function 35) and transmits the adjusted value as the changed desired transmission ratio $ue_{des\_v}$.

The first transition function 37 is activated to control the transmission during a change from the automatic mode 32 to the manual mode 33; that is, a change from the first method of operation in which the transmission ratio is selected automatically to the second method of operation which is influenced by the driver. Inversely, the second transition function controls the transition from the manual function 33 to the automatic function 32.

The recognition function 40 has the object of recognizing a "low speed driving" situation. This includes all driving situations which are driven for an extended time period at a low speed; for example, stop-and-go traffic, door-to-door delivery traffic, etc. To recognize low speed driving, the recognition function 40 determines when a starting operation exists (that is, it waits until the driving speed v(t) reaches the zero value), and thereafter determines whether the throttle valve position alpha(t) and the resulting throttle valve actuating speed dalpha(t)/dt are below the preset limit values G1 and G2. In the embodiment, the limits value G1 concerning the throttle valve position alpha(t) is 50%, and the limit value G2 concerning the throttle valve actuating speed dalpha(t)/dt is 100%/sec. Accordingly, the recognition function 40 recognizes the "low speed driving" situation when, after a stoppage of the vehicle, the driver gives little gas, or gives gas in a comparatively slow manner.

A violation of one of the two conditions results in the cessation of the "low speed driving" recognition, and another recognition of a starting operation is required in order to again recognize the "low speed driving" situation. In order to prevent a premature cessation at this point, at the start of the recognition function 40, either the throttle valve position alpha(t) is passed through a lowpass filter, or the violation of one of the conditions must exist for a given time period. It should be observed that the limit G2 has a positive value; that is, the decrease of the throttle valve position alpha(t) can take place at an arbitrarily high speed.

The recognition function 40 examines whether the throttle valve position alpha(t) is greater than a lower limit value G3. This limit value is set at 10% in the embodiment, so that it is in the proximity of the idling position, and indicates a decrease of the throttle valve position alpha(t) almost to the idling position. If all above-mentioned conditions are met, the recognition function 40 activates the adapting function 41 by means of an output signal. If the throttle valve position alpha(t) is below the limit value G3, even when a "low speed driving" situation is recognized, no output signal is emitted and thus activation of the adapting function 41 is interrupted. If one of the two limit values G1 and G2 is exceeded, it is recognized that the "low speed driving" situation no longer exists and the activating of the adapting function 41 is terminated.

When it is activated, the adapting function 41 determines by means of the present throttle valve position alpha(t) a desired rotational input speed $ne_{des}$. Subsequently, the highest desired transmission ratio $ue_{des\_1}$, corresponding to the starting gear, is adjusted in such a manner that the desired rotational input speed $ne_{des}$ is adjusted at the input of the transmission. In this case the changed desired transmission ratio $ue_{des\_v}$ is set to a value no lower than a predetermined level which is greater than the next lower, preset desired transmission ratio $ue_{des\_2}$ by a fixed amount. This amount is determined as a percentage of the transmission ratio jump from the preset transmission ratio $ue_{des\_1}$ to the preset transmission ratio $ue_{des\_2}$.

When the adapting function 41 is deactivated, the already adjusted changed desired transmission ratio $ue_{des\_v}$ is maintained. A shifting requirement signal shr terminates the operation of the recognition function 40 in every case, and therefore also leads to deactivation of the adapting function 41. In the case of a shifting requirement signal shr "downshifting", a transition to the originally selected desired transmission ratio $ue_{des\_}i$ takes place under the condition that a changed desired transmission ratio $ue_{des\_}v$ is already adjusted.

Figure 4:
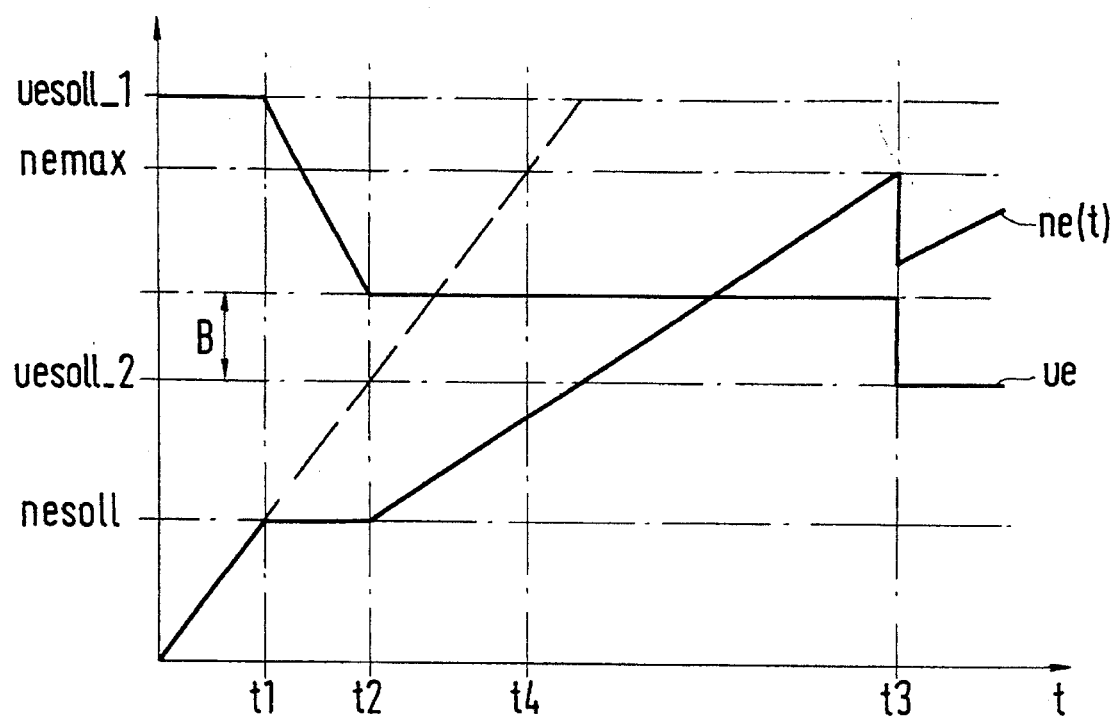
FIG. 4 is a diagram which shows the time sequence of the rotational speed of a driving engine and of the adjusted transmission ratio during the operation of the control device according to a first embodiment of the invention.

FIG. 4 is a diagram which illustrates the time sequence of the transmission ratio ue and of the rotational input speed ne for a continuously rising driving speed v(t), with the adjustment feature according to the invention. (It is a prerequisite that the adapting function 41 is activated.) First, the transmission ratio ue is held constant at the value of the starting transmission ratio $ue_{des\_}1$ ("first gear") and the rotational input speed ne(t) rises to the value of the desired rotational input speed $ue_{des}$ indicated by the throttle valve position alpha(t). At the point in time $t_1$, the rotational input speed ne reaches the desired rotational input speed $ne_{des}$ and the adapting function 41 adjusts the transmission ratio ue in the direction of the second preset transmission ratio $ue_{des\_}2$ in such a manner that the rotational input speed ne remains thereafter at the value of the desired rotational input speed $ne_{des}$. At the point in time $t_2$, the transmission ratio ue reaches its lower limit value (a preset minimum distance to the next lower preset transmission ratio $ue_{des\_}2$), and the adapting function 41 terminates the change of the transmission ratio ue, holding it constant. Thus, the rotational input speed will again rise. At the point in time $t_3$, the rotational input speed ne reaches a maximum rotational input speed value $ne_{max}$, and the safety function 39 forces a change to the next lower preset transmission ratio $ue_{des\_}v$ (unless, of course, the driver has previously initiated an upshifting by means of a shifting requirement signal shr).

If the adapting function 41 is not activated as described above, the first preset desired transmission ratio $ue_{des\_}1$ is maintained constant at the transmission 2. In this case, the rotational input speed ne rises continuously (broken line) and, at the point in time $t_4$, reaches its maximum value $ne_{max}$ so that the safety function 39 initiates an upshifting. The difference between the points in time $t_4$ and $t_3$ is the time or the speed range which is obtained by the adapting function 41 when the "low speed driving" situation is recognized. Also, it can be seen that the jump in the transmission ratio which occurs at time $t_4$ without adjustment of the transmission ratio (form $ue_{des\_}1$ to $ue_{des\_}2$) is much greater than the jump in the line ue which occurs at des time $t_3$ with the adjustment feature according to the invention.

Figure 6:
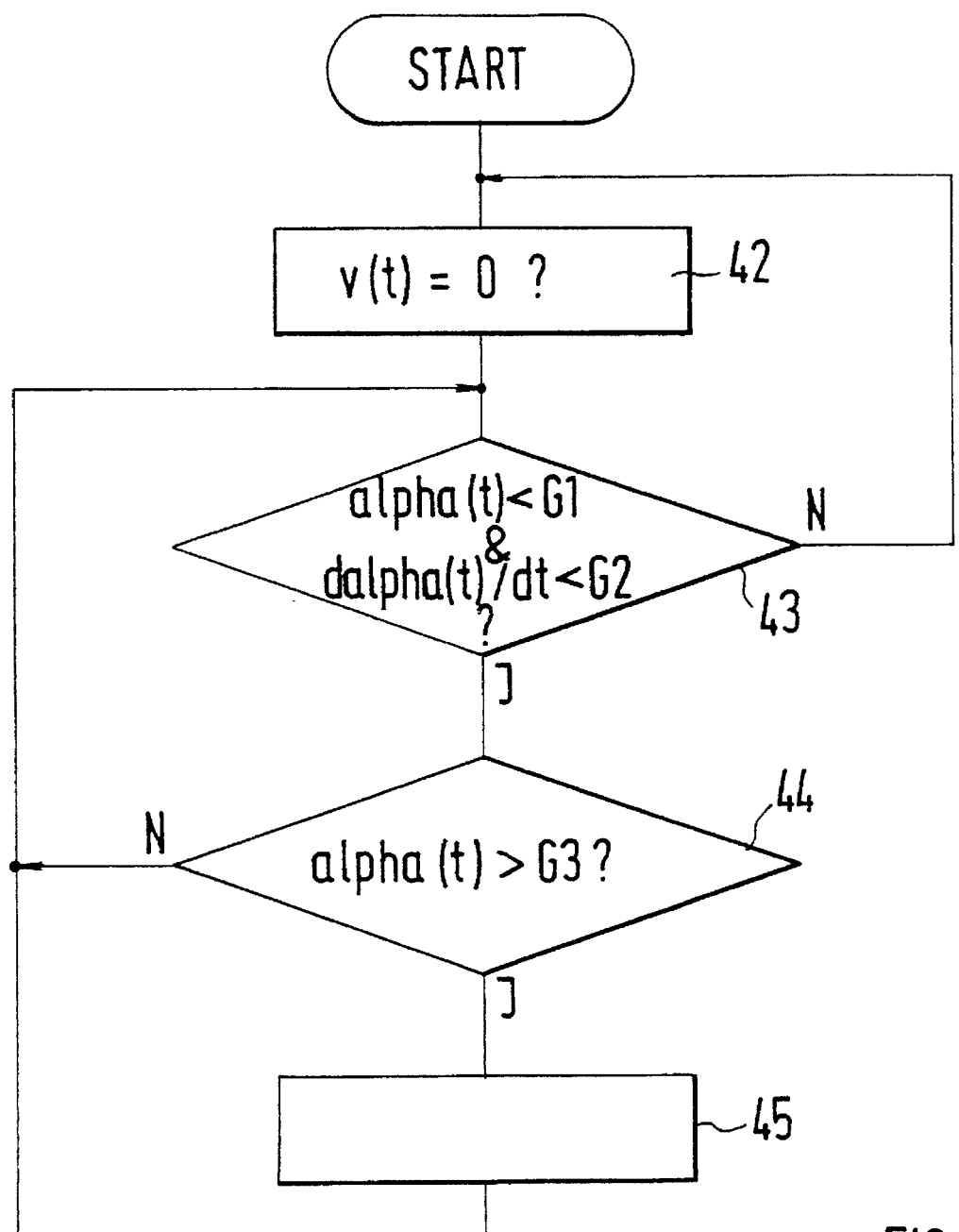
FIG. 6 is a flow chart of a recognition function.

FIG. 6 illustrates in a flow chart how the above-described recognition function 40 is formed by means of a programmed control device. Initially, in step 4, a starting operation is awaited; that is, the system waits at step 42 until the driving speed v(t) has reached the zero value. Thereafter, in step 43, it is determined whether the throttle position alpha(t) and the resulting throttle valve speed dalpha(t)/dt are both below the limit values G1 (50%) and G2 (100%/sec.) assigned to them. If either one of the conditions is not met, processing returns to step 42. If, however, both conditions are met, it is determined in the next step 44 whether the throttle valve position alpha(t) is greater than the third limit value G3 (10%). If so, the adapting function 41 is activated in step 45. If, however, the determination in step 44 is negative, processing returns to step 43, and activation of the adapting function 41 is interrupted.

Figure 7:
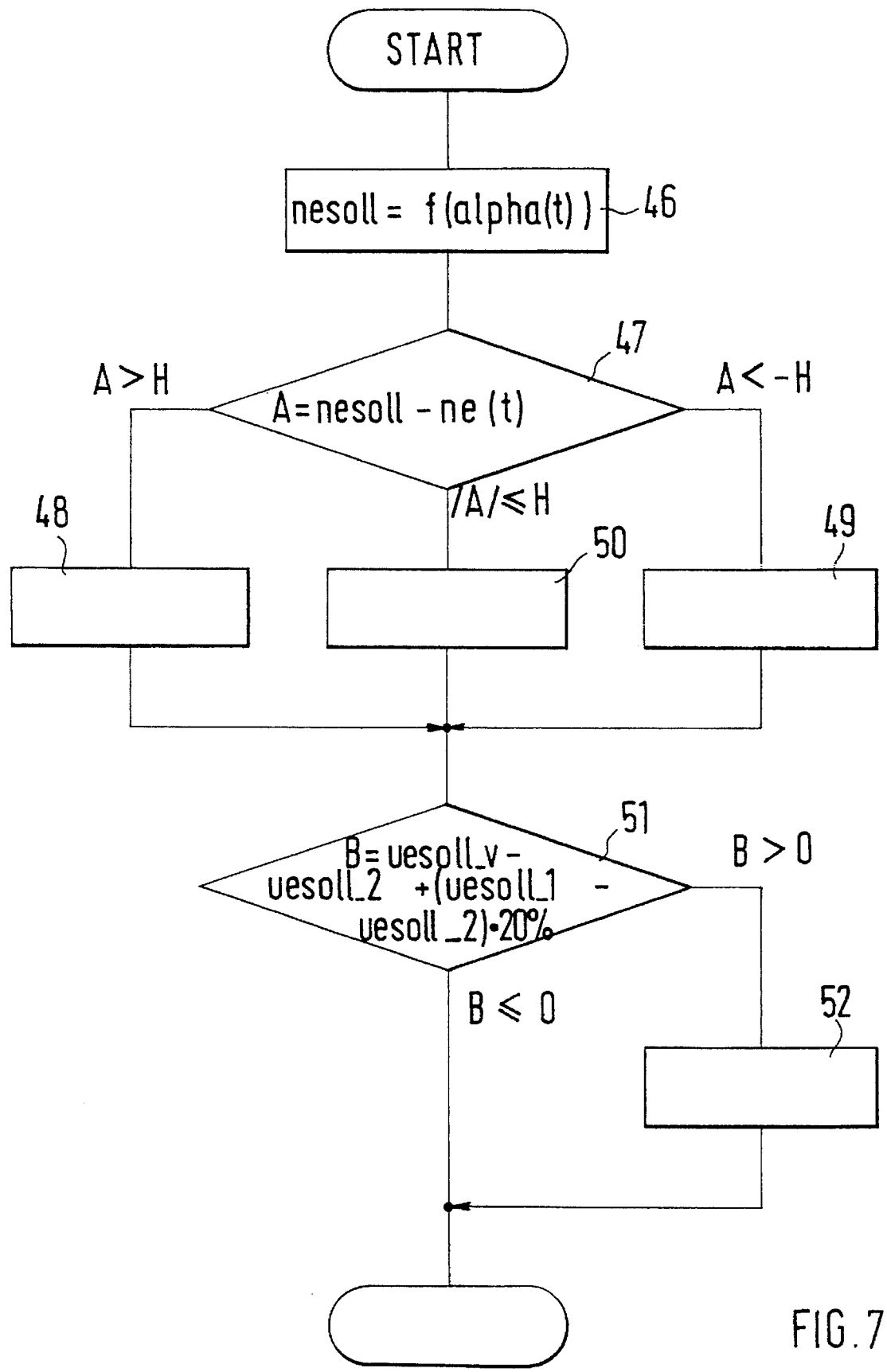
FIG. 7 is a flow chart of an adapting function.

FIG. 7 is a flow chart which illustrates how the adapting function 41 is formed by means of a programmable control device. When the adapting function 41 is activated, in step 46, by means of a table, a desired rotational input speed $ne_{des}$ is determined from the throttle valve position alpha(t). Subsequently, in step 47, a difference A between the rotational input speed ne and the desired rotational input speed $ne_{des}$ is formed: $A=ne_{des}-ne(t)$. If the difference A is larger than a predetermined hysteresis value H, in step 48, a changed desired transmission ratio $ue_{des\_}v$ is formed which is larger than the presently adjusted transmission ratio ue. If, on the other hand, the deviation A is smaller than the negative value of the hysteresis H, in step 49, a changed desired transmission ratio $ue_{des\_}v$ is formed which is smaller than the presently adjusted transmission ratio ue. If the amount of the deviation A is smaller than or equal to the hysteresis value H, in step 50, the presently adjusted transmission ratio ue is maintained. Before adjustment of the changed desired transmission ratio $ue_{des\_}v$ determined in steps 48 to 50, in step 51, the distance B is formed as a portion of the difference between the desired transmission ratio $ue_{des\_}v$ and the next lower preset desired transmission ratio $ue_{des\_}2$. That is, the limit value is determined as a percentage (here, 20%) of the jump from the first preset desired transmission ratio $ue_{des\_}1$ to the second preset desired transmission ratio $ue_{des\_}2$: $B=ue_{des\_}v-ue_{des\_}2+(ue_{des\_}1-ue_{des\_}2)* 20\%$. If a deviation B larger than zero is determined, in step 52, the determined changed desired transmission ratio $ue_{des\_}v$ input to the adjusting function 31. Otherwise, no signal is input and thus there is no adjustment of the changed desired transmission ratio $ue_{des\_}v$.

The adjustment of a changed desired transmission ratio value $ue_{des\_}v$ larger than the first desired transmission ratio $ue_{des\_}1$ is suppressed by the adjusting function 31. The sequences illustrated in FIGS. 6 and 7 are terminated at any time when a shifting requirement signal shr is recognized.

The recognition function 40 and the adapting function 41 interact as follows: As soon as a starting operation is recognized, and as along as the conditions for the throttle valve position alpha(t) and the throttle valve speed dalpha(t)/dt are met, the driving situation "low speed driving" is recognized and the adapting function 41 is activated. It is interrupted when the throttle valve position alpha(t) falls under the lower limit value G3 , and is resumed when the throttle valve position alpha(t) is again above the limit value G3.

When the adapting function 41 is activated, it changes the transmission ratio ue, which is adjusted in the transmission, in such a manner that, if possible, a desired rotational input speed $ne_{des}$, dependent on the throttle valve position alpha(t), is reached. In this case, the change of the transmission ratio ue is limited in the upward direction by the largest preset desired transmission ratio $ue_{des\_}1$ and in the downward direction by the preset distance B to the next lower preset desired transmission ratio $ue_{des\_}2$. If one of these limits is reached, thereafter no adjustment of the transmission ratio ue takes place.

Figure 5:
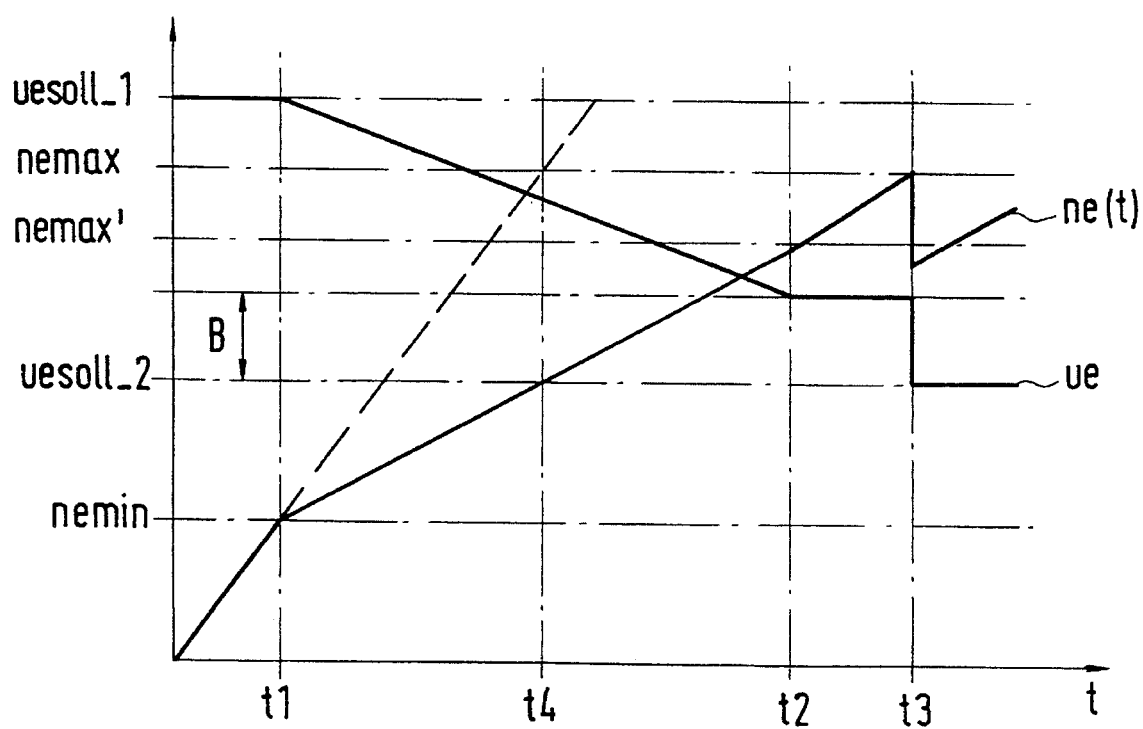
FIG. 5 is a diagram which shows the time sequence of the rotational speed of a driving engine and of the adjusted transmission ratio during the operation of the control device according to a second embodiment of the invention.

FIG. 5 illustrates the time sequence of the transmission ratio ue and of the rotational input speed ne(t) in the case of a continuously rising driving speed v(t) in an alternative embodiment of the adapting function 41. This differs from the above-described adapting function 41 in that, between the points in time $t_1$ and $t_2$, the transmission ratio ue is not adjusted to maintain the rotational input speed ne(t) constant at the desired rotational input speed $ne_{des}$ but, after a minimal rotational input speed $ne_{min}$ is reached, the transmission ratio ue is adjusted according to a given function depending on the rotational input speed ne(t). In this case, the minimal rotational input speed $ne_{min}$ may fixedly be selected in a quantity that the internal-combustion engine 4 runs smoothly, or in a similar manner like the desired rotational input speed $ne_{des}$ in the case of the above-mentioned embodiment be made dependent on either the transmission rotational input speed ne(t) or the driving speed v(t).

Thus, between the points in time $t_1$ and $t_2$, a course of the rotational input speed ne(t) occurs which is proportional to the driving speed v(t). In this case, the function for determining the transmission ratio $ue_{des\_v}$ and thus for adjusting the transmission ratio ue, is selected such that, when the preset distance B to the next lower preset desired transmission ratio $ue_{des\_2}$ is reached, at the same time, a limit value is reached for the rotational input speed $ne_{max'}$. This limit value for the rotational input speed $ne_{max'}$ is slightly below the maximum value for the rotational input speed $ne_{max}$.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. In a control device for an infinitely variable motor vehicle transmission which simulates a stepped transmission by selecting desired transmission ratios from among a group of preset transmission ratios, apparatus for adjusting a selected desired transmission ratio, said apparatus comprising:

a recognition device for detecting a state of low speed driving;

an adapting device, operative in response to a detection of low speed driving, for reducing a highest preset transmission ratio when a preset rotational input speed is reached.

2. Control device according to claim 1, wherein the recognition device comprises means for determining when a position of a power control element for a driving engine connected with the transmission is below a first limit value and, at the same time, an adjusting speed of the position of the power control element is below a second limit value, and for generating a low speed driving signal in response thereto.

3. Control device according to claim 1, wherein the recognition device comprises means for determining when speed of the vehicle is below a limit value and, at the same time, an adjusting speed of position of a power control element for a driving engine connected with the transmission is below a limit value, and for generating a low speed driving signal in response thereto.

4. Control device according to claim 2, wherein the recognition device issues said low speed driving signal only when a starting operation is occurring.

5. Control device according to claim 4, wherein the recognition device issues said low speed driving signal only when a starting operation is occurring.

6. Control device according to claim 1, wherein:

the adapting device changes a currently selected preset transmission ratio so that the rotational input speed remains essentially constant;

a change of the transmission ratio commences when a preset desired rotational input speed is achieved, and ends when a preset limit value for the transmission ratio is achieved.

7. Control device according to claim 4, wherein:

the adapting device changes a currently selected preset transmission ratio so that the rotational input speed remains essentially constant;

a change of the transmission ratio commences when a preset desired rotational input speed is achieved, and ends when a preset limit value for the transmission ratio is achieved.

8. Control device according to claim 1, wherein the adapting device changes the preset transmission ratio according to a preset function depending in a rotational input speed of the transmission, the change starting when a preset rotational input speed is reached, and ending with when a preset limit value for the transmission ratio is reached.

9. Control device according to claim 4, wherein the adapting device changes the preset transmission ratio according to a preset function depending in a rotational input speed of the transmission, the change starting when a preset rotational input speed is reached, and ending with when a preset limit value for the transmission ratio is reached.

10. Control device according to claim 8, wherein the preset function is selected so that rotational input speed of the transmission reaches a preset limit at the same time the transmission ratio reaches a preset limit value.

11. In a process for controlling an infinitely variable motor vehicle transmission which simulates a stepped transmission by selecting desired transmission ratios from among a group of preset transmission ratios, the steps comprising:

detecting a state of low speed driving of said vehicle; and when a state of low speed driving is detected, reducing a highest preset transmission ratio.

12. Control process according to claim 11, wherein said step of detecting a state of low speed driving further comprises the steps of:

determining as a first condition whether position of a power control element for a driving engine connected with the vehicle transmission is below a first limit value;

determining as a second condition whether an adjusting speed of position of a power control element is below a second limit value; and recognizing a state of low speed driving if both of said first and second conditions are met simultaneously.

13. Control process according to claim 11, wherein said step of detecting a state of low speed driving further comprises the steps of:

determining as a first condition whether speed of the vehicle is below a first limit value;

determining as a second condition whether an adjusting speed of position of a power control element is below a second limit value; and recognizing a state of low speed driving when both of said first and second conditions are met simultaneously.

14. Control process according to claim 12, further comprising the step of determining when a starting operation is occurring, wherein said reducing step is performed only when a starting operation is occurring.

15. Control process according to claim 13, further comprising the step of determining when a starting operation is occurring, wherein said reducing step is performed only when a starting operation is occurring.

16. Control process according to claim 11, wherein said step of reducing the highest preset transmission ratio further comprises the steps of:

waiting until rotational input speed of the transmission has reached a preset desired value;

adjusting the desired transmission ratio so that the rotational input speed remains substantially constant; and terminating the reducing step when the desired transmission ratio reaches a preset limit value.

17. Control process according to claim 13, wherein said step of reducing the highest preset transmission ratio further comprises the steps of:

waiting until rotational input speed of the transmission has reached a preset desired value;

adjusting the desired transmission ratio so that the rotational input speed remains substantially constant; and terminating the reducing step when the desired transmission ratio reaches a preset limit value.

18. Control process according to claim 11, wherein the step for reducing the highest preset transmission ratio further comprises the steps of:

waiting until rotational input speed of the transmission has reached a preset smallest value;

adjusting desired transmission ratio according to a preset function depending on rotational input speed of the transmission; and terminating the reducing step when the desired transmission ratio reaches a preset limit value.

19. Control process according to claim 13, wherein the step for reducing the highest preset transmission ratio further comprises the steps of:

waiting until rotational input speed of the transmission has reached a preset smallest value;

adjusting desired transmission ratio according to a preset function depending on rotational input speed of the transmission; and terminating the reducing step when the desired transmission ratio reaches a preset limit value.

20. Control process according to claim 18, wherein the step for adjusting the desired transmission ratio is selected as a function of the rotational input speed in such a manner that the rotational input speed reaches a preset limit value when the preset limit value for the transmission ratio is reached.

\* \* \* \* \*